Patented June 9, 1942

2,285,914

UNITED STATES PATENT OFFICE 2,285,914

OXIDATION OF CYCLOHEXANOL

Otto Drossbach, Ludwigshafen-on-the-Rhine, Germany, assignor to E. I. du Pont de Nemours & Company Inc., Wilmington, Del.

No Drawing. Application December 6, 1940, Serial No. 368,885. In Germany December 28, 1939

1 Claim. (Cl. 260—531)

The present invention relates to the oxidation of organic compounds.

The oxidation of organic compounds in the liquid phase by the treatment with oxygen or gases containing oxygen, preferably in the presence of oxidation catalysts, such as salts of copper, manganese, iron, cobalt or nickel or organic oxidation catalysts, has been extensively studied. When starting materials are used which under normal pressure are gaseous or easily volatile at the oxidation temperature, it is necessary to work under increased pressure. This procedure is dangerous in that inflammable organic liquids when contacted with oxygen or air under increased pressure tend to explode, in particular in the presence of an oxidation catalyst. Inflammable organic compounds, therefore, cannot be oxidized generally in the liquid phase at elevated temperatures under superatmospheric pressure.

I have now developed a process for oxidizing organic compounds in the liquid phase under superatmospheric pressure, in particular under pressures exceeding 10 atmospheres. Broadly speaking, my method consists in using oxygen in admixture with such an amount of an inert diluent gas that the oxygen content of the gaseous oxidizing mixtures is insufficient to promote complete oxidation, i. e., the conversion of the starting material into the oxides of carbon.

The oxidizing gases employed in the execution of my invention essentially comprise oxygen-containing gas mixtures wherein the oxygen amount is lower than in air, and preferably at most 10 per cent. Suitable mixtures are for example oxygen-carbon dioxide mixtures containing from 90 to 95 per cent of carbon dioxide or mixtures of nitrogen and oxygen containing at least 95 per cent of nitrogen. Instead of nitrogen or carbon dioxide or mixtures thereof there may also be used non-oxidizable organic compounds which are gaseous under the reaction conditions, for example tetrachlormethane. The oxygen content of these mixtures is so low that the far-reaching oxidation of the starting material which might be accompanied by the formation of flames or explosions does not occur. It is a surprising fact that the oxygen content of these mixtures is still sufficient to promote the partial oxidation of organic compounds or, in other words, the formation of desirable oxidation products, provided that the reaction is carried out under superatmospheric pressure. There are numerous organic compounds which are so easily oxidized under the conditions of the present invention that the gas emerging from the reaction liquid is almost entirely free from oxygen.

The invention is particularly applicable in the production of alcohols, carboxylic acids or ketones by the oxidation of aliphatic compounds in the liquid phase. It is understood that the term "aliphatic" is intended to include all compounds containing aliphatically bound carbon atoms, such as open chain aliphatic compounds, araliphatic compounds and alicyclic carbon compounds. For example saturated or unsaturated aliphatic aldehydes may be converted into carboxylic acids; cycloaliphatic hydrocarbons, alcohols or ketones may be oxidized, ketones may be prepared by the oxidation of secondary alcohols; or dicarboxylic acids may be prepared by the oxidation of polyhydric alcohols. The starting materials may be dissolved in an inert solvent, e. g. water, choloroform, tetrachlormethane, before subjecting them to oxidation.

The reaction may be carried out in the presence of a catalyst, as for example in the presence of a salt of copper, manganese, iron, cobalt or nickel, in particular such salts as are soluble in the reaction liquid, e. g. the salts of fatty acids, naphthenic acids or aromatic carboxylic acids. In some cases, the use of a metallic catalyst may be entirely dispensed with an organic oxidation catalysts may be used. Cyclohexanol, for example, may be oxidized according to my invention in the absence of metal salts provided that a small amount of cyclohexanone which acts as a catalyst is present.

The reaction conditions depend on the nature of the starting material. Generally speaking the oxidation is carried out at an oxidation temperature within the range of from 35 to 150° C. The pressure should be within the range of from 10 to 30 atmospheres; higher pressures may also be employed.

My invention makes it possible to carry out the oxidation with high yields in small reaction vessels. The most favorable oxidation temperatures may easily be maintained because the comparatively high amount of diluent gas which is passed through the reaction liquid prevents the temperature from rising excessively.

The following examples will further illustrate how my invention may be carried out in practice but the invention is not restricted to these examples.

*Example 1*

The reaction vessel consists of a pressuretight, vertically arranged tube of 2 meters length and 80 millimeters internal diameter made from V2A steel, the lower half of which is charged with porcelain rings and copper turnings.

The lower part of the tube is electrically heated while the upper part is surrounded by a cooling jacket. The upper end of the tube is connected with a reflux condenser.

Three quarters of the tube are filled with α-methyl-acroleine to which 2 grams of copper acrylate have been added. The whole is heated to 30° C., and a mixture of 95 per cent of nitrogen and 5 per cent of oxygen is blown into the liquid under a pressure of 15 atmospheres through a nozzle at the bottom of the tube. Heating is then discontinued because the liquid heats itself to 40° C. The speed of flow of the gaseous mixture is so chosen that about 400 liters of gas leave the reflux cooler per hour. The exit gas is nearly free from oxygen. It may be used again in a cycle after having added thereto fresh oxygen for that consumed.

After 24 hours about 40 per cent of the acroleine have been oxidized. The liquid is withdrawn from the vessel and the methacrylic acid formed worked up.

*Example 2*

2 kilograms of cyclohexanol containing 0.3 per cent of cyclohexanone are treated in the tube described in Example 1 at 130° C. under 20 atmospheres pressure with a mixture of 95 per cent of nitrogen and 5 per cent of oxygen. The exit gas contains 1 to 2 per cent of oxygen. After 8 hours, the oxidation is discontinued. About equal amounts of cyclohexanone and adipic acid are obtained in a yield of 60 per cent calculated on the amount of cyclohexanol converted.

*Example 3*

Cyclohexane, containing 0.1 per cent of cobalt naphthenate and 0.5 per cent of cyclohexanone is treated in the manner described in Example 2 with a mixture of oxygen and nitrogen at 145° C. After 18 hours there is obtained a mixture of cyclohexane, cyclohexanol, cyclohexanone, adipic acid and higher molecular oxidation products from which first the adipic acid (yield 14 per cent) is separated off. The remaining mixture of cyclohexane, cyclohexanol (yield 4 per cent) and cyclohexanone (yield 4 per cent) may be fractionally distilled and separated into its constituents. The rate of conversion amounts to 35 per cent.

What I claim is:

A process for the oxidation of cyclohexanol which comprises passing through a composition consisting essentially of cyclohexanol and a small quantity of cyclohexanone as a catalyst, at oxidation temperature, a gaseous mixture containing an inert gas and not to exceed 10% oxygen, under a pressure of at least 10 atmospheres, and recovering from the resulting mass the oxidation products comprising adipic acid and cyclohexanone.

OTTO DROSSBACH.